United States Patent
Steffey et al.

(10) Patent No.: US 11,210,949 B1
(45) Date of Patent: Dec. 28, 2021

(54) METER TIME NOTIFICATION OF OTHER VEHICLES TO DRIVER

(71) Applicant: TOYOTA MOTOR ENGINEERING & MANUFACTURING NORTH AMERICA, INC., Plano, TX (US)

(72) Inventors: Preston Steffey, Ypsilanti, MI (US); Derek A. Thompson, Ypsilanti, MI (US); Sean Xu, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/895,774

(22) Filed: Jun. 8, 2020

(51) Int. Cl.
  *G08G 1/14* (2006.01)
  *H04W 4/024* (2018.01)
  *H04W 4/44* (2018.01)
  *H04W 4/029* (2018.01)

(52) U.S. Cl.
  CPC ............ *G08G 1/141* (2013.01); *G08G 1/146* (2013.01); *H04W 4/024* (2018.02); *H04W 4/029* (2018.02); *H04W 4/44* (2018.02)

(58) Field of Classification Search
  CPC ....... G08G 1/141; G08G 1/146; H04W 4/024; H04W 4/44; H04W 4/029
  See application file for complete search history.

(56) References Cited

U.S. PATENT DOCUMENTS

| | | | |
|---|---|---|---|
| 8,830,322 B2 | 9/2014 | Nerayoff et al. | |
| 10,235,581 B2 | 3/2019 | Koravadi | |
| 10,692,374 B2 * | 6/2020 | Salvucci | G08G 1/144 |
| 2010/0261465 A1 * | 10/2010 | Rhoads | G08C 17/00 |
| | | | 455/420 |
| 2012/0130777 A1 * | 5/2012 | Kaufman | H04W 4/48 |
| | | | 705/13 |
| 2014/0218527 A1 | 8/2014 | Subramanya | |

(Continued)

FOREIGN PATENT DOCUMENTS

WO  2006106369 A1  10/2006

OTHER PUBLICATIONS

Review of parking spaces assistance schemes in vehicular networks (http://ijaerd.com/papers/special_papers/C1020309.pdf), Accessed: 2015.

(Continued)

*Primary Examiner* — Mohamed Barakat
(74) *Attorney, Agent, or Firm* — Dinsmore & Shohl, LLP

(57) ABSTRACT

Systems and methods for providing meter time notifications to a user are disclosed. The system includes a display, a receiver that receives one or more signals from one or more parking meters via a vehicle-to-infrastructure communication system, the one or more signals including an identification of an occupied parking space and an amount of time remaining before the occupied parking space must be vacated, and a processing device communicatively coupled to the display and to the receiver. The processing device is configured to receive the one or more signals from the receiver, determine the amount of time remaining for one or more occupied parking spaces based on the one or more signals received via the receiver, and cause the display to display an indicator of one or more occupied parking spaces and the associated amount of time remaining.

12 Claims, 3 Drawing Sheets

(56) References Cited

U.S. PATENT DOCUMENTS

| | | | |
|---|---|---|---|
| 2015/0161890 A1* | 6/2015 | Huntzicker | G08G 1/147 340/932.2 |
| 2016/0178376 A1* | 6/2016 | Moore | G08G 1/143 701/532 |
| 2017/0025008 A1 | 1/2017 | Gignac et al. | |
| 2017/0045369 A1 | 2/2017 | Kim et al. | |

OTHER PUBLICATIONS

Investigating vehicle-to-vehicle communication for cooperative car parking: The CoPark approach (https://ieeexplore.ieee.org/document/7580732), Accessed: Mar. 10, 2016.

* cited by examiner

METER TIME NOTIFICATION OF OTHER VEHICLES TO DRIVER

TECHNICAL FIELD

The present specification generally relates to systems and methods for monitoring vehicle surroundings, and more specifically, to systems and methods for providing vehicles and devices with information regarding parking spot availability.

BACKGROUND

Currently, parking meters locally indicate an amount of time remaining in an occupied parking spot. Additionally, some mobile applications provide their user with an amount of time remaining on the meter corresponding to where their car is parked. However, drivers seeking a parking spot must circle city street blocks and/or parking lot rows searching for an open parking spot. That is, technology does not currently exist for notifying drivers when and where a parking spot opens and/or for notifying drivers when and where a parking spot is about to open.

SUMMARY

In one embodiment, a system for providing meter time notifications to a user is provided. The system includes a display, a receiver that receives one or more signals from one or more parking meters via a vehicle-to-infrastructure communication system, the one or more signals including an identification of an occupied parking space and an amount of time remaining before the occupied parking space must be vacated, and a processing device communicatively coupled to the display and to the receiver. The processing device is configured to receive the one or more signals from the receiver, determine the amount of time remaining for one or more occupied parking spaces based on the one or more signals received via the receiver, and cause the display to display an indicator of one or more occupied parking spaces and the associated amount of time remaining.

In some embodiments, a method of providing meter time notifications to a driver of a vehicle includes receive, via a receiver at a processing device, one or more signals from one or more parking meters, wherein the one or more signals include an identification of an occupied parking space and an amount of time remaining before the occupied parking space must be vacated, determining, with the processing device, the amount of time remaining for one or more occupied parking spaces based on the one or more signals received via the receiver, and causing, by the processing device, a display to display an indicator of one or more occupied parking spaces and associated amount of time remaining.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein relate to systems and methods for providing an amount of time remaining on a parking meter for an occupied parking space to a driver of a vehicle. The vehicle or a mobile device of a driver may be in wireless communication with one or more parking meters via a network or in a peer-to-peer communication link. The parking meters may broadcast a signal that indicates how much time remains on the parking meter. The broadcast signal may be received by a receiver of a vehicle or a mobile device. The broadcast signal may include an identification of an occupied parking space and an amount of time remaining on the parking meter associated with that space. A processing unit of the vehicle or the mobile device may determine the amount of time remaining and present the amount of time remaining on a display of the vehicle or the mobile device in addition to a location of the space.

In some embodiments, the signals received from the parking meters may be from parking meters located within the vicinity of the vehicle. However, in some instances, the signals received from the parking meters may be from one or more parking meters located in the vicinity of a future destination of the vehicle. The future destination of the vehicle may be determined based on a navigation system destination, such as a predetermined destination input by a user.

The display may present the amount of time remaining as an overlay on a map of an area around the vehicle or on a map of an area around a vehicle's future destination. The overlay may include an indicator such as a time positioned on the map at the location of the occupied parking space or as an indicator that is optionally selectable by a driver to bring up information about the parking space. In some embodiments, one or more parking spaces are identified on a map and a key is provided adjacent the map that includes a reference to the parking space and the associated time remaining on the parking meter for the occupied parking space.

In yet further embodiments, the system may utilize vehicle-to-vehicle (V2V) communication whereby the vehicle in a parking space broadcasts to nearby vehicles one or more V2V signals. The V2V signals may indicate the amount of time remaining on the parking meter associated with the parked vehicle. The V2V signals may indicate that a vehicle is leaving a parking space either at the expiration of the time on the parking meter or in advance of the expiration of the time on the parking meter.

The following will now describe the systems and methods for providing an amount of time remaining on a parking meter for an occupied parking space to a driver of a vehicle in more detail.

Figure 1:
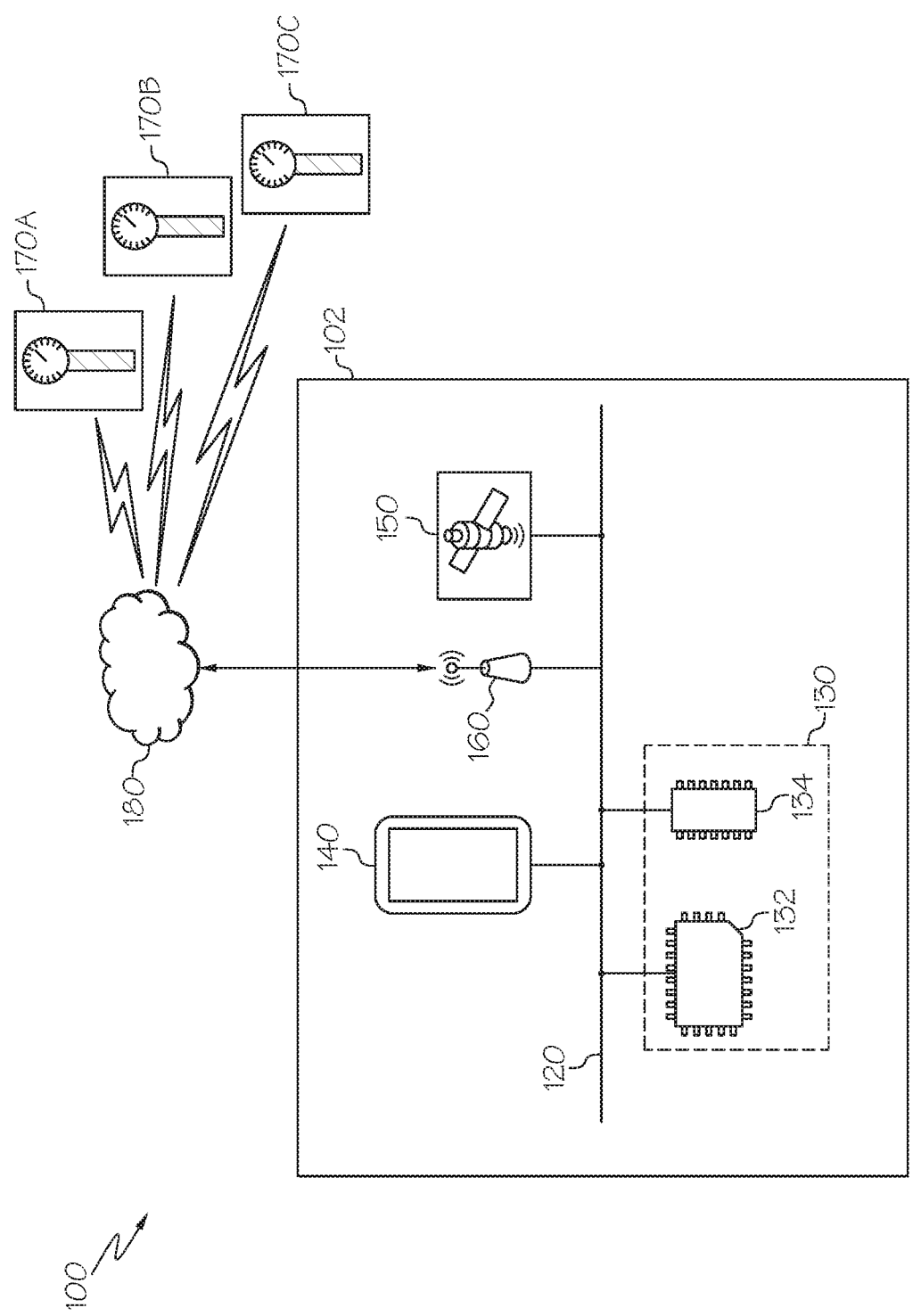
FIG. 1 depicts an illustrative schematic of a system for providing an amount of time remaining on a parking meter for an occupied parking space to a driver of a vehicle according to one or more embodiments shown and described herein.

Turning now to the drawings where like numbers refer to like structures, and particularly to FIG. 1, an illustrative schematic of a system 100 for providing an amount of time remaining on a parking meter for an occupied parking space to a driver of a vehicle is depicted. FIG. 1 provides one example configuration of the components and system for providing an amount of time remaining on a parking meter for an occupied parking space to a driver of a vehicle via an electronic device 102. It is understood that the electronic device 102, for example, a vehicle electronic control unit (ECU) or other integrated computing device, a mobile device, or other device, may implement the system 100 described herein. For purposes of the following description, the system 100 will be described as implemented in an electronic device 102 of a vehicle, however, references may be made to implementation of the system 100 with respect to a mobile device such as a smart phone or other device such as a laptop or other electronic device. It is further contemplated that the vehicle may be an automobile, truck, motorcycle, bicycle, scooter, moped, boat, ship or anytime of vehicle that may be capable of being parked in a designated location such as on a street, in a parking lot or garage, a bike or scooter rack, a loading bay, a harbor slip, or the like.

The system 100 includes a processing device 130 comprising a processor 132 and a non-transitory computer readable memory 134, a display 140, a global positioning system (GPS) unit 150, and network interface hardware 160 such as a receiver, transmitter, or transceiver. These and other components of the system 100 may be communicatively connected to each other via a communication path 120.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The processing device 130 may be any device or combination of components comprising a processor 132 and non-transitory computer readable memory 134. The processor 132 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the system 100 depicted in FIG. 1 includes a single processor 132, other embodiments may include more than one processor 132.

The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 1 includes a single non-transitory computer readable memory 134, other embodiments may include more than one memory module.

Still referring to FIG. 1, the system 100 includes a display 140 for providing visual output such as, for example, a map, parking space locations, an amount of time remaining on a parking meter, and/or other information. The display 140 is coupled to the communication path 120. Accordingly, the communication path 120 communicatively couples the display 140 to other modules of the system 100. The display 140 may include any medium capable of transmitting an optical output such as, for example, a cathode ray tube, light emitting diodes, a liquid crystal display, a plasma display, or the like. Moreover, the display 140 may be a touchscreen that, in addition to providing optical information, detects the presence and location of a tactile input upon a surface of or adjacent to the display 140. Accordingly, each display 140 may receive a mechanical input directly upon the optical output provided by the display 140. Additionally, it is noted that the display 140 can include at least one of the one or more processors 132 and one or more non-transitory computer readable memory 134. While the system 100 includes a display 140, for example, implemented in an electronic device 102, the display 140 may be a display 140 of a mobile device.

The system 100 may also include a, GPS unit 150 that is coupled to the communication path 120 and communicatively coupled to the processing device 130. The GPS 150 is capable of generating location information indicative of a location of the electronic device 102 by receiving one or more GPS signals from one or more GPS satellites. The GPS signal (e.g., one or more location signals) communicated to the processing device 130 via the communication path 120 may include location information comprising, for example, a National Marine Electronics Association (NMEA) message, a latitude and longitude data set, a street address, a name of a known location based on a location database, or the like. Additionally, the GPS unit 150 may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

Still referring to FIG. 1, vehicles are now more commonly equipped with vehicle-to-vehicle communication systems. Some of the systems rely on network interface hardware 160. The network interface hardware 160 may be coupled to the communication path 120 and communicatively coupled to the processing device 130. The network interface hardware 160 may be any device capable of transmitting and/or receiving data with a network 180 or directly with another vehicle or one or more parking meters 170A-170C equipped with a V2V or vehicle-to-infrastructure (V2I) communication system. Accordingly, network interface hardware 160 can include a communication transceiver for sending and/or receiving any wired or wireless communication. For example, the network interface hardware 160 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 160 includes hardware configured to operate in accordance with the Bluetooth wireless communication protocol. In another embodiment, network interface hardware 160 may include a Bluetooth send/receive module for sending and receiving Bluetooth communications to/from a network 180 and/or another vehicle or one or more parking meters 170A-170C.

As mentioned herein, the system 100 is configured to communicate with and/or receive signals from one or more parking meters 170A-170C. The one or more parking meters 170A-170C may be on-street parking meters, parking garage meters, multispace meters, or the like. The one or more parking meters 170A-170C are capable of communicating meter time via one or more signals over a V2I communication system and/or other communication infrastructure such as a local wireless communication system or the like. The one or more parking meters 170A-170C may be further configured to sense whether a vehicle is parked in the parking space associated with the parking meter and transmit such information in addition to the meter time.

Figure 2:
FIG. 2 schematically depicts a display displaying an illustrative map with parking space locations overlaid on the map according to one or more embodiments shown and described herein.

Embodiments of the system in operation will now be described with reference to FIG. 2. FIG. 2 depicts an illustrative display 140 displaying an illustrative map 200 with parking space locations 210, 220, 230, 240, 250, 260 overlaid on the map 200. The map 200 may be a map presented on a display 140 of an electronic device 102 or via an application on a mobile device. The map 200 may be interactive. That is, a driver or user may select parking space locations 210, 220, 230, 240, 250, 260 for additional information such as the remaining meter time or in some instances reserve the parking space once the meter time expires. The map 200 may be a map used for navigation and therefore may include a future destination 270 and/or the present location of the electronic device 102 associated with the vehicle in the area. The display of the map 200 may further be customized to view only meter time in the vicinity of the electronic device 102 associated with the vehicle. The display of the map 200 may also be customized to view only meter time in the vicinity of the future destination 270. The map 200 may provide indicators as to the location of the occupied or unoccupied parking space locations 210, 220, 230, 240, 250, 260 within a pin-type icon located on the map 200 at the location of the parking space. The pin-type icon may further present the remaining meter time for the parking space location 210, 220, 230, 240, 250, 260 that the pin-type icon is associated with. In some embodiments, the remaining meter time may be presented in a key positioned adjacent or overlaid with the map 200.

As one or more signals are received from the one or more parking meters 170A-170C associated with the parking space locations 210, 220, 230, 240, 250, 260 the meter time for the parking space locations 210, 220, 230, 240, 250, 260 may be updated to provide the driver with a real time view of the parking situation in an area. In some embodiments, for example, where a parking meter is capable of determining whether the parking space locations 210, 220, 230, 240, 250, 260 as occupied with a vehicle, the map 200 may present such information to the driver. That is, in many cases a vehicle may leave a parking space prior to the meter time expiring. In such a case, the meter time indicator on the map 200 may be adjusted to zero time or indicate that the space is now vacant when the parking meter transmits a signal indicating the parking space is no longer occupied with a vehicle.

In similar instances, if a vehicle occupying a parking space leaves before the meter time expires, the vehicle leaving the parking space may transmit a signal to the system 100 indicating that the parking meter previously associated with the parked vehicle is now vacant. In this case, the map 200 may also be updated to reflect the status of the parking space and may adjust the meter time associated with the parking space to zero time, indicating that it is available.

Figure 3:
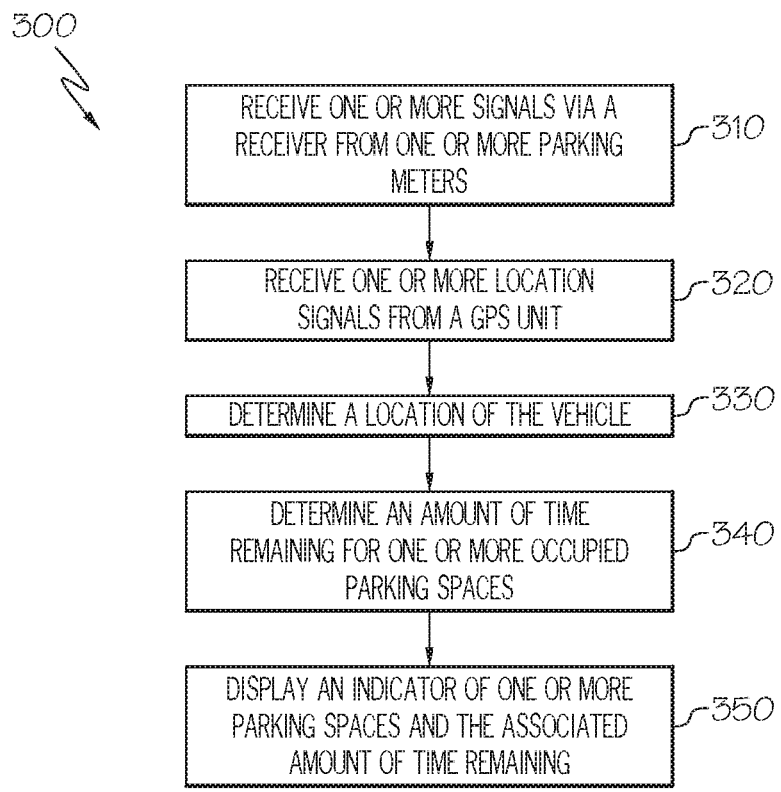
FIG. 3 depicts a flow diagram 300 illustrating an example method for providing meter time notifications to a driver of a vehicle according to one or more embodiments shown and described herein.

Turning now to FIG. 3, a flow diagram 300 illustrating an example method for providing meter time notifications to a driver of a vehicle is depicted. As noted hereinabove, the method may be implemented by a processing device 130 (FIG. 1) of an electronic device 102 (FIG. 1) associated with the vehicle, such as a vehicle ECU, a mobile device of a driver, or other electronic device. At block 310, a receiver, such as network interface hardware 160 (FIG. 1), may receive one or more signals from one or more parking meters. In some embodiments, the parking meters 170A-170C may broadcast a signal that indicates how much time remains on the parking meter. The broadcast signal may be received by a receiver of an electronic device 102 associated with the vehicle such as a vehicle ECU or a mobile device. The broadcast signal may include identification of an occupied parking space and an amount of time remaining on the parking meter associated with that space. In some embodiments, the parking meters 170A-170C utilize a network such as a V2I communication system or a peer-to-peer communication link such as via Bluetooth® technology to communicate one or more signals indicating the amount of time remaining on the meter to the system 100.

In some embodiments, the system 100 may utilize vehicle-to-vehicle (V2V) communication whereby the vehicle in a parking space broadcasts to nearby vehicles one or more V2V signals. The V2V signals may indicate the amount of time remaining on the parking meter associated with the parked vehicle. The V2V signals may indicate that a vehicle is leaving a parking space either at the expiration of the time on the parking meter or in advance of the expiration of the time on the parking meter.

At block 320, a GPS unit 150 (FIG. 1) may be implemented in the system 100 and receive one or more location signals. It should be understood that in some implementations, the system 100 does not require a GPS unit 150 or to determine the precise location of an electronic device 102 associated with the vehicle as merely being in range of a broadcasted signal from one or more parking meters 170A-170C may be sufficient to identify occupied parking space locations and the associated remaining meter time. However, in embodiments that include a GPS unit 150 the received one or more location signals may be utilized to identify the location of the electronic device 102, at block 330. The location of the electronic device 102 associated with the vehicle may be used to filter out one or more parking meters 170A-170C that are not within a predetermined distances from the vehicle. The location of the electronic device 102 associated with the vehicle may also be used to determine how far from a predetermined future destination 270 (FIG. 2) the electronic device 102 associated with the vehicle is and thereby determine an estimated amount of time that will be remaining on a parking meter when the vehicle is estimated to arrive at the future destination 270.

At block 340, the processing device 130 (FIG. 1) determines an amount of time remaining for one or more occupied parking spaces based on the received one or more signals from the one or more parking meters 170A-170C (FIG. 1). The processing device 130 may further determine the location of the one or more parking meters 170A-170C based on the received one or more signals. Based on the determined location the processing device 130 may display the location of the one or more parking space locations 210, 220, 230, 240, 250, 260 associated with the one or more parking meters 170A-170C on the map 200 (FIG. 2) on the display 140 (FIGS. 1 and 2), at block 350. The processing device 130 also displays an indicator of the associated amount of time remaining on the one or more parking meters 170A-170C on the map 200. The display 140 may present the amount of time remaining as an overlay on a map 200 of an area around the vehicle (e.g., the electronic device 102) or on a map 200 of an area around a vehicle's future destination. The overlay may include an indicator such as a time positioned on the map 200 at the location of the occupied parking space or as an indicator that is optionally selectable by a driver to bring up information about the parking space. In some embodiments, one or more parking space locations 210, 220, 230, 240, 250, 260 are identified on the map 200 and a key is provided adjacent the map 200 that includes a reference to the parking space locations 210, 220, 230, 240, 250, 260 and the associated time remaining on the parking meters 170A-170C for the occupied parking space.

It should be understood that steps of the aforementioned processes may be omitted or performed in a variety of orders while still achieving the object of the present disclosure. The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It should now be understood that embodiments described herein are directed to vehicle convoy systems and methods for or providing meter time notifications of occupied spaces to a driver of a vehicle. Embodiments include a system having a display, a receiver, and a processing device. The receiver receives one or more signals from one or more parking meters via a vehicle-to-infrastructure communication system. The one or more signals include an identification of an occupied parking space and an amount of time remaining before the occupied parking space must be vacated. The processing device is configured to receive one or more signals from the receiver, determine an amount of time remaining for one or more occupied parking spaces based on the one or more signals received via the receiver, and cause the display to display an indicator of one or more occupied parking spaces and associated amount of time remaining.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   a display;
   a receiver that receives one or more signals broadcast from one or more parking meters via a peer-to-peer communication link, the one or more signals including an identification of an occupied parking space and an amount of time remaining before the occupied parking space must be vacated; and
   a processing device communicatively coupled to the display and to the receiver, the processing device configured to:
   receive the one or more signals from the receiver,
   determine the amount of time remaining for one or more occupied parking spaces based on the one or more signals,
   cause the display to display an indicator of one or more occupied parking spaces and the associated amount of time remaining; and
   update the display to indicate that a first parking space of the one or more occupied parking spaces is vacant in response to receiving an update signal broadcasted from a parking meter corresponding to the first parking space when a vehicle, previously occupying the first parking space, signals to the parking meter that the vehicle is leaving the first parking space before the amount of time remaining expires.

2. The system of claim 1, further comprising a GPS unit, wherein the GPS unit receives one or more location signals and the processing device is further configured to locate a vehicle in an environment.

3. The system of claim 2, wherein the processing device identifies one or more parking meters within a vicinity of the vehicle based on the one or more signals received from the GPS unit.

4. The system of claim 1, wherein the display displays a map of an area around a vehicle and one or more parking spaces indicators overlaid on the map include the indicator indicating the amount of time remaining on a parking meter.

5. The system of claim 1, wherein the display is an infotainment display coupled to a vehicle and configured with map data for navigation.

6. The system of claim 1, wherein the display is a component of a mobile device and the mobile device is communicatively coupled with the receiver and the processing device.

7. The system of claim 1, wherein the display displays a map of an area around a future predefined destination of a vehicle and one or more parking space indicators overlaid on the map include an indication of an estimated amount of time remaining on a parking meter when the vehicle is estimated to arrive at the predefined destination.

8. A method comprising:
  receiving one or more signals broadcast from one or more parking meters via a peer-to-peer communication link, the one or more signals including an identification of an occupied parking space and an amount of time remaining before the occupied parking space must be vacated;
  determining the amount of time remaining for one or more occupied parking spaces based on the one or more signals;
  causing a display to display an indicator of one or more occupied parking spaces and associated amount of time remaining; and
  updating the display to indicate that a first parking space of the one or more occupied parking spaces is vacant in response to receiving an update signal broadcasted from a parking meter corresponding to the first parking space when a vehicle, previously occupying the first parking space, signals to the parking meter that the vehicle is leaving the first parking space before the amount of time remaining expires.

9. The method of claim 8, further comprising receiving, via a GPS unit, one or more location signals and locating the vehicle in an environment.

10. The method of claim 9, further comprising identifying one or more parking meters within a vicinity of the vehicle based on the one or more signals received from the GPS unit.

11. The method of claim 8, further comprising displaying a map of an area around the vehicle and one or more parking spaces indicators overlaid on the map include the indicator indicating the amount of time remaining on a parking meter.

12. The method of claim 8, further comprising:
  estimating an amount of time remaining on a parking meter when the vehicle is estimated to arrive at a future predefined destination, and
  displaying a map of an area around the future predefined destination of the vehicle and one or more parking space indicators overlaid on the map include an indication of an estimated amount of time remaining on the parking meter when the vehicle is estimated to arrive at the future predefined destination.

* * * * *